United States Patent
Pastore

[11] 3,987,554
[45] Oct. 26, 1976

[54] SEGMENT MEASURING GAUGE
[76] Inventor: Jimmy Pastore, 6990 Kern Drive, Rubidoux, Calif. 92509
[22] Filed: July 7, 1975
[21] Appl. No.: 593,659

[52] U.S. Cl. ................................ 33/200; 351/5
[51] Int. Cl.² ........................................ A61B 3/10
[58] Field of Search ................ 33/107 R, 108, 111, 33/174 A, 200; 351/5, 20

[56] References Cited
UNITED STATES PATENTS

| | | | |
|---|---|---|---|
| 1,675,407 | 7/1928 | Dvorine | 33/200 |
| 1,981,438 | 11/1934 | Smith | 33/200 |
| 2,632,257 | 3/1953 | Belgard | 33/200 |
| 3,531,869 | 10/1970 | Hays et al. | 33/174 A |

FOREIGN PATENTS OR APPLICATIONS

| | | | |
|---|---|---|---|
| 1,408,211 | 7/1965 | France | 351/5 |
| 83,198 | 3/1921 | Germany | 33/108 |

Primary Examiner—Richard E. Aegerter
Assistant Examiner—Richard R. Stearns
Attorney, Agent, or Firm—Harvey S. Hertz

[57] ABSTRACT

A segment measuring gauge for ophthalic frames. A base member has a lower edge and an upper portion and a plurality of fingers extending vertically from the upper portion. A scale is formed on the gauge extending from adjacent the base member lower edge toward the vertically extending fingers. In use, the gauge is inserted into eye glass lens rim openings with the lower edge resting in the bottom portion of the lens well and the fingers interleaving the upper rim portion enabling the proper segment height to be read as well as to determine if the patient has a hyper-condition.

4 Claims, 4 Drawing Figures

SEGMENT MEASURING GAUGE

BACKGROUND OF THE INVENTION

1. Field of the Invention

The field of art to which the invention pertains includes the filed of segment measuring devices for spectacle lenses, particularly with respect to a measuring gauge which is self-retaining when inserted into the lens well of a frame.

2. Description of the Prior Art

In order to determine bifocal lens segment size and placement for lenses within the lens frames, a standard millimeter rule has been used to estimate the approximate position of bifocal segments for conveying this information to the lens maker. This approximation technique has been proven inaccurate. One type of an arrangement to improve this accuracy includes a transparent lens segment which is provided with a scale. The narrow lower end is positioned in the lens well of the lens frame and a resilient member is secured to the lens segment. The resilient member engages the upper portion of the lens frame for releasably securing the lens segment in the roof of the frame. Typically, the resilient member is a spring which is attached to the lens segment. It has been found, particularly with the use of oversized frames, that the spring and lens segment combination would slip thereby causing the scale to be displaced at an angle and thus giving an inaccurate reading. In addition, different sized lens segment and spring arrangements must be stocked for different sized frames. Further, the measuring device must be inverted to permit determination of the most desirable and functional placement of the upper segment in double segment bifocals.

The present invention overcomes the prior art disadvantages of the lens segment and spring combinatins as well as other prior art devices and is formed of a relatively inexpensive unitary gauge. The measuring gauge can be utilized with all sizes frames and gives an accurate reading of the proper lens segment.

Known prior art includes U.S. Pat. Nos. 1,675,407; 1,981,438; 2,326,030; and 2,632,257.

SUMMARY OF THE INVENTION

A segment measuring gauge for ophthalic frames includes a base member having a lower edge and an upper portion, and a plurality of fingers extending vertically from the upper portion. A scale is formed on the gauge extending from adjacent the base member lower edge toward the vertically extending fingers.

The advantages of this invention, both as to its construction and mode of operation, will be readily appreciated as the same becomes better understood by reference to the following detailed description when considered in connection with the accompanying drawings in which like reference numerals designate like parts throughout the Figures.

DESCRIPTION OF THE PREFERRED EMBODIMENTS

Figure 1:
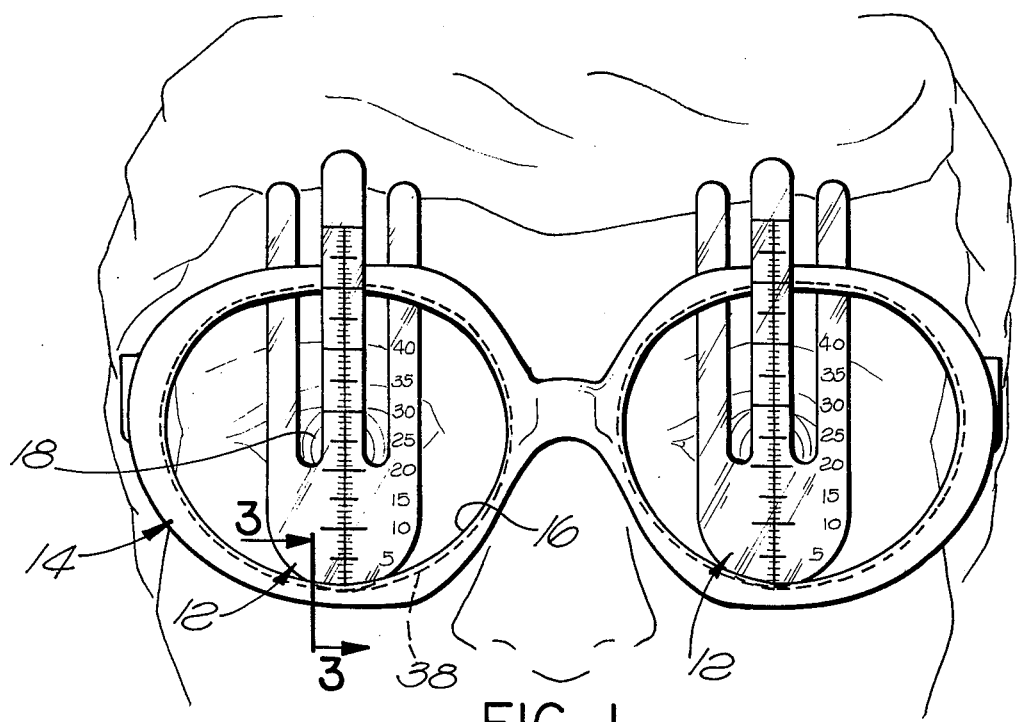
FIG. 1 is a frontal view of a pair of eyeglass frames having a segment measuring gauge positioned in each of the lens openings.

Referring now to the drawings there is shown in FIG. 1 a pair of segment measuring gauges 12 each mounted in a pair of ophthalic frames 14. The frames 14 are illustrated as being mounted in a normal wearing position of a person so that the lens position in the frame opening 16 can be determined with respect to the person's pupil 18.

Figure 2:
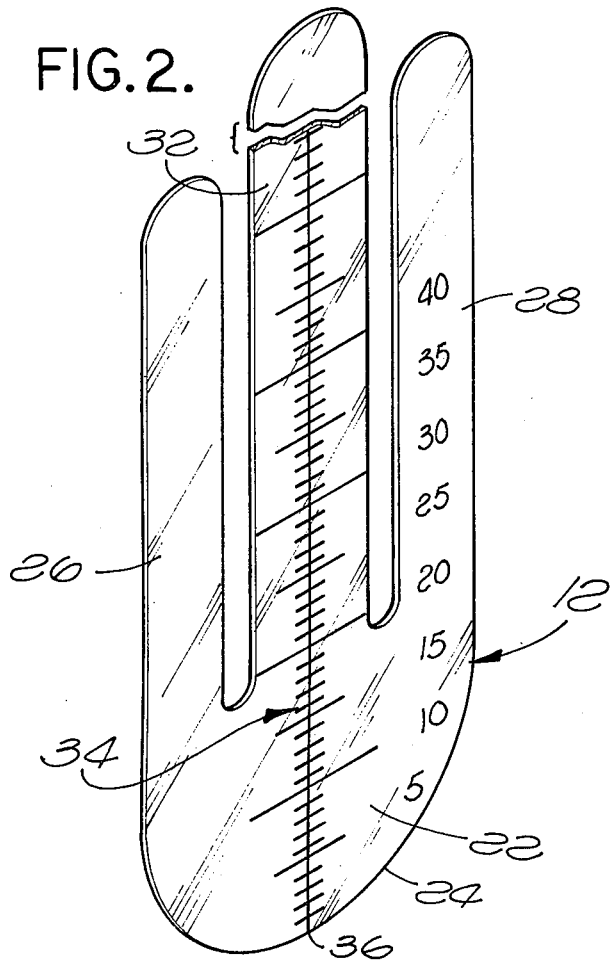
FIG. 2 is a perspective view of a segment measuring gauge of FIG. 1.

Referring now to FIG. 2 the segment measuring gauge is illustrated in perspective view and comprises a base member 22 whose lower edge 24 defines a semicircle. It should be understood, however, that other edge shapes such as oval, or eliptical, could be used as well. Three vertically extending fingers formed of outer fingers 26 and 28 and a central finger 32 extend upwardly from the base member 22. A scale 34 is printed on the base member and extends vertically from the base member central lower tip 36 vertically upwardly along the central finger 32. Typically, the scale is in millimeter increments. However, of course, other conventional measurements such as inches, of course, could be used as well.

Figure 3:
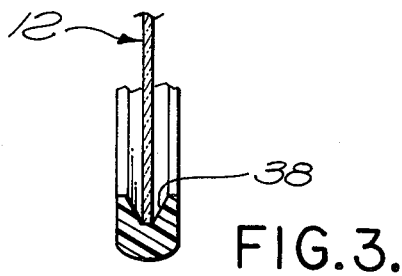
FIG. 3 is a partial cross-sectional view of the measuring gauge and frames of FIG. 1 illustrating the positioning of the gauge in the lens well.

As shown in FIG. 3, the measuring gauge is inserted so that the lower edge 24 rests in the lower portion of the lens well 38 (shown also in dotted lines in FIG. 1).

Referring again to FIG. 1, the central finger 32 is shown mounted in front of the frames 14 while the outer fingers 26 and 28 are illustrated behind the frames, thus securing the measuring gauge 12 to the frame and preventing movement thereof. The scale 34 is printed along a vertical axis which intersects the pupil 18. It should be noted that the fingers extend above the top end of the frame 14 and thus can be used for almost all sized frames, oversized and otherwise.

After the measuring gauges have been inserted into the lens frame openings shown in FIG. 1, proper segment heights for bifocal lenses can be readily read. In addition, the user can determine if the patient has a hyper-condition, i.e. the eyes are offset at different horizontal levels, or for other single vision lens center measurements.

Typically the measuring gauge is made of a clear acetate plastic material which is flexible and has the scale 34 printed thereon. The flexibility of the material enables the fingers 26, 28 and 32 to be positioned on different sides of the frames as illustrated in FIG. 1. While three fingers have been illustrated in the drawings, it should be understood, of course, that a minimum of two fingers would normally be required to secure the gauge to the frame during measurement. In addition, any number of fingers could be utilized.

Figure 4:
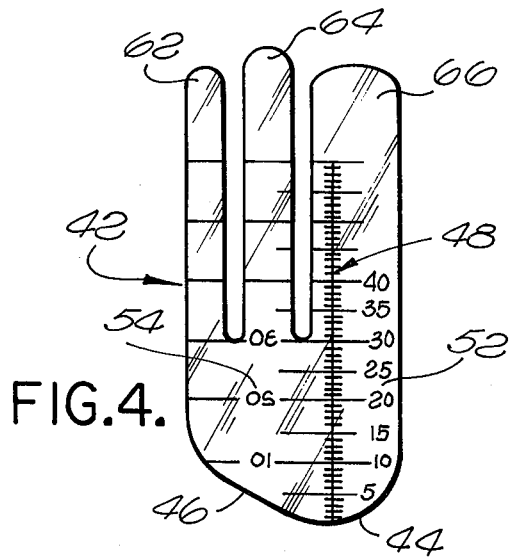
FIG. 4 is a frontal view of an alternate arrangement of the measuring gauge.

Referring now to FIG. 4 there is shown an alternative arrangement wherein a segment measuring gauge 42 has a lower edge 44 which is cut away on one side 46 thereof enabling the measuring gauge to be inserted in goggles having a similar cut-away frame surface (not shown). In addition, the scale 48 has its numerical indicia 52 printed so that it can be read clearly from one surface thereof and a second set of indicia 54 printed in mirror-like fashion so that the measuring gauge 42 can be reversed and placed on the opposite lens opening of the goggles. Additionally, it should be noted that the gauge is illustrated containing three fingers, a first finger 62 being positioned approximately on one side of the gauge, a central finger 64 adjacent thereto and a third finger on the opposite side of the gauge being of slightly greater width enabling the scale 48 to be printed thereon together with the numerical indicia 52 as well.

I claim:

1. A segment measuring gauge for ophthalic frames comprising:
    a planar base member having a lower edge formed of a smooth continuous surface and an upper portion;
    a plurality of fingers extending vertically from said upper portion when said base member lower edge is inserted in the bottom lens groove of a pair of ophthalic frames; and
    a scale formed on said gauge extending from adjacent said base member lower edge towards said vertically extending fingers;
    said base member and said fingers being formed of a single piece of integrally formed transparent flexible material for enabling said fingers to extend from the plane of said base member at varying intersecting angles and interleave an edge of said frame.

2. A segment measuring gauge in accordance with claim 1 wherein said scale extends onto at least one of said fingers.

3. A segment measuring gauge in accordance with claim 1 wherein said gauge contains at least three vertically extending fingers.

4. A segment measuring gauge in accordance with claim 1 wherein indicia are formed on both sides of said gauge for enabling said scale indicia to be read from either side of said scale.

* * * * *